(12) United States Patent
Wiseman (10) Patent No.: US 7,398,400 B2
(45) Date of Patent: Jul. 8, 2008

(54) COMPUTER SYSTEM PROTECTION

(75) Inventor: Simon Robert Wiseman, Malvern (GB)

(73) Assignee: Qinetiq Limited (GB)

( * ) Notice: Subject to any disclaimer, the term of this patent is extended or adjusted under 35 U.S.C. 154(b) by 570 days.

(21) Appl. No.: 10/466,141

(22) PCT Filed: Dec. 24, 2001

(86) PCT No.: PCT/GB01/05767
§ 371 (c)(1),
(2), (4) Date: Jul. 11, 2003

(87) PCT Pub. No.: WO02/056156
PCT Pub. Date: Jul. 18, 2002

(65) Prior Publication Data
US 2004/0139334 A1      Jul. 15, 2004

(30) Foreign Application Priority Data
Jan. 13, 2001  (GB) .................... 0100955.4

(51) Int. Cl.
*G06F 12/14* (2006.01)
(52) U.S. Cl. .................... 713/188
(58) Field of Classification Search .................... 713/188
See application file for complete search history.

(56) References Cited

U.S. PATENT DOCUMENTS

| | | | |
|---|---|---|---|
| 5,623,600 A * | 4/1997 | Ji et al. ................ | 726/24 |
| 6,006,328 A | 12/1999 | Drake ................ | 726/23 |
| 6,691,230 B1 * | 2/2004 | Bardon ................ | 726/27 |
| 6,986,052 B1 * | 1/2006 | Mittal ................ | 713/190 |

FOREIGN PATENT DOCUMENTS

GB       2315575       2/1998

OTHER PUBLICATIONS eSafe Protect for Windows 95, Virus Bulletin, Apr. 1998, pp. 20-23.
Anad, et al. "A Flexible Security Model for Using Internet Content", IEEE, pp. 89-96 (1997).
Islam et al., "A Flexible Security System for Using Internet Content", IEEE pp. 52-59 (1997).

* cited by examiner

*Primary Examiner*—Kambiz Zand
*Assistant Examiner*—Aubrey H Wyszynski
(74) *Attorney, Agent, or Firm*—McDonnell Boehnen Hulbert & Berghoff LLP (57) ABSTRACT

Computer system protection to protect against harmful data from an external computer network (60) (e.g. the Internet) involves supplying incoming data (62) to a software checker (64) as the data enters a computer system (not shown). The checker (64) routes any suspect data (66) to an encryptor (68) which encrypts it to render it unusable and harmless. Encrypted data passes to a computer (72) in an internal network (74) and having a desktop quarantine area or sandbox (76) for suspect data. The computer (72) runs main desktop applications (78) receiving encrypted data (70) for storage and transfer, but not for use in any meaningful way because it is encrypted. Equally well applications (78) cannot be interfered with by encrypted data (70) because encryption makes this impossible. On entry into the sandbox (76), the encrypted data (70) is decrypted to usable form it then becomes accessible by software (204) suitable for use in the sandbox (76) subject to sandbox constraints.

22 Claims, 4 Drawing Sheets

COMPUTER SYSTEM PROTECTION

This application is a 371 of PCT/GB01/05767, filed on Dec. 24, 2001, which claims priority to GB0100955.4, filed on Jan. 13, 2001.

This invention relates to a method for computer system protection against unwanted external interference such as for example by viruses, to a computer program for implementing such protection and to a computer system protected thereby.

Computer software applications, offer progressively more flexible features and become better integrated as computer technology develops. Unfortunately this has the effect of increasing the exposure of computer systems to attack: attacks by Trojan Horse software exploit hidden features of applications software running on a victim's computer, and attacks by viruses result in software introduced by an attacker spreading from one computer to another. Computer system protection therefore becomes progressively more difficult as technology advances. Attacks on computer systems may damage information they hold, leak that information or prevent legitimate computer system users carrying out their work.

Current industry best practice in computer system protection, as described in the text book "Network Security" by Kaufman, Perlman and Speciner, is to apply a software checker to data as it enters a computer system: the checker identifies a potential attack, allowing any data that appears to be an attack to be rejected. Unfortunately, it is very difficult to identify an attack accurately using software checkers and it is often necessary to err on the side of caution. The result is that data that is harmless and perhaps valuable may not be allowed to enter the system.

A computer system which rejects harmless and sometimes valuable data is not a reliable business tool, so to reduce the loss of data it is known to place rejected data in what is referred to as "quarantine": quarantine is a region of computer storage not accessible by normal users and their software applications such as word processors, but instead accessible by computer experts who can inspect rejected data manually and decide whether or not it is harmful. Expert manual inspection of data in quarantine can be much more accurate at detecting an attack than a software checker. Thus a proportion of data that is rejected by an automatic software checker may subsequently be identified as harmless and allowed to enter the computer system.

Manual inspection of quarantined data improves reliability of communication between a computer system and the outside world, but it results in delay which can be significant and it requires costly expert staff to implement it. Moreover, automatic checkers and manual inspection are both prone to failure. In particular, both automatic and manual checks are poor at detecting new and therefore unfamiliar forms of attack. Forms of attack are associated with functionalities available in applications; new forms of attack therefore appear as software applications are further developed. Hence current industry best practice in computer system protection is costly and ineffective, and this situation will not improve.

Another prior art technique referred to as "sandboxing" is described in the text book "Java Security" by Scott Oaks: it provides an alternative to the data rejection approach. In this technique data is allowed to enter a computer system, but the system environment, i.e. the way in which the data can be used, is constrained. Should data prove to constitute an attack, the Trojan Horse or virus which it implements has access only to the constrained environment and cannot corrupt software applications outside it, i.e. beyond the sandbox boundary.

The most common form of sandbox is that provided for JAVA® applets, which are self contained elements of software written in Sun Microsystems' language JAVA that can be executed on a wide variety of different types of computer. Unfortunately, the JAVA® sandbox suffers from the drawback of only working for JAVA® applets and not for data in any other form. For example, a Microsoft® Word document cannot be edited by the Microsoft® Word application with a JAVA® sandbox.

More general-purpose sandboxes have been built or proposed, but are not in general use: examples include research software from University California Berkeley called Janus and described in a paper entitled "Janus: An approach for Confinement of Untrusted Applications", David A Wagner, UC Berkeley Computer Science Division, report CSD-99-1056, August 1999. These utilise security features within an operating system to separate software executing within the sandbox from other software executing on a computer system in the form of a main workstation desktop.

The use of sandboxing does not, however, really solve the problem. This is because viruses may still spread freely within the constrained environment provided by the sandbox and users will inevitably need to move data across the sandbox boundary, to reflect business needs to exchange data.

It is an object of the invention to provide an alternative form of computer system protection.

The present invention provides computer system protection including a sandbox application for receiving potentially harmful data and defining a sandbox desktop, characterised in that it also includes means for encrypting potentially harmful data to render it harmless and means for decrypting encrypted data for processing by means of an application constrained by the sandbox application.

The invention provides the advantage of enabling potentially harmful data to be examined and executed while constrained by the sandbox application: this in turn allows a user to decide the data's importance while the data is quarantined by encryption. Unwanted material can be discarded, avoiding the need for further inspection. Moreover, important messages need not be delayed awaiting expert inspection, but instead made available to a system user in a constrained quarantine environment provided by a sandbox desktop.

The sandbox application may be arranged to employ a desktop application which does not communicate with applications associated with a main desktop of a computer system to which the protection is applied.

The computer system protection may includes means for enabling a user to retrieve data from the sandbox application in encrypted form for relaying to expert inspection and means for checking decrypted data released from the sandbox desktop for potentially harmful content. It may be mounted upon a computer linked via a firewall to an external network.

In another aspect, the invention provides a protected computer system having a sandbox application for receiving potentially harmful data and defining a sandbox desktop, characterised in that it also includes a firewall protecting a check from an external network to which it is linked, the checker includes means for encrypting potentially harmful data to render it harmless and the system has means for decrypting encrypted data for processing by the sandbox application.

The protected computer system may include software for encrypting potentially harmful data which a user wishes to process using applications associated with a main desktop of the system instead of a sandbox application. It may also include software for encrypting potentially harmful data to render it harmless and software for decrypting encrypted data for processing by means of applications constrained by the sandbox application.

The sandbox application may be arranged to employ a desktop application which does not communicate with applications associated with a main desktop of a computer system to which the protection is applied.

The protected computer system may include software for enabling a user to retrieve data from the sandbox application in encrypted from the relaying to expert inspection, and software for checking decrypted data released from the sandbox desktop for potentially harmful content. It may linked via a firewall to an external network.

In a further aspect, the present invention provides a method of protecting a computer system against harmful data, the system including a sandbox application for receiving potentially harmful data and defining a sandbox desktop, characterised in that the method incorporates the steps of:
(a) encrypting potentially harmful data to render it harmless, and
(b) decrypting encrypted data for processing by means of an application constrained by the sandbox application.

The sandbox may incorporate a desktop application which does not communicate with applications associated with a main desktop of a computer system protected by the method.

The method may include the step of retrieving data from the sandbox application in encrypted form for relaying to expert inspection. It may also include checking decrypted data released from the sandbox desktop for potentially harmful content, and may be used with a computer system linked via a firewall to an external network.

The present invention also provides a method protecting a computer system having a sandbox application for receiving potentially harmful data and defining a sandbox desktop, characterised in that the method includes:
(a) using a firewall to protect a checker from an external network to which the system is linked,
(b) using the check to encrypt potentially harmful data to render it harmless, and
(c) decrypting encrypted data for processing by the sandbox application.

In a still farther aspect, the present invention provides computer software for protecting a computer system against harmful data, the system including a sandbox application for receiving potentially harmful data and defining a sandbox desktop, characterised in that the computer software is arranged to:
a) encrypt potentially harmful data to render it harmless, and
b) decrypt encrypted data for processing while being constrained by the sandbox application.

The computer software may incorporate within the sandbox a desktop application arranged not to communicate with applications associated with a main desktop of a computer system which it protects. It may be arranged to retrieve data from the sandbox application in encrypted form for relaying to expert inspection, and to check decrypted data released from the sandbox desktop for potentially harmful content.

The computer system may be linked via firewall to an external network.

In a further alternative aspect, the present invention provides computer software for protecting a computer system having a sandbox application for receiving potentially harmful data and defining a sandbox desktop, characterised in that the computer software is arranged to:
a) implement a firewall protecting a checker from an external network to which the system is linked,
b) implement encryption by the checker to encrypt potentially harmful data to render it harmless, and
c) decrypt encrypted data for processing by the sandbox application.

In order that the invention may be more fully understood, embodiments will now be described, by way of example only, with reference to the accompany drawings, in which.

Figure 1:
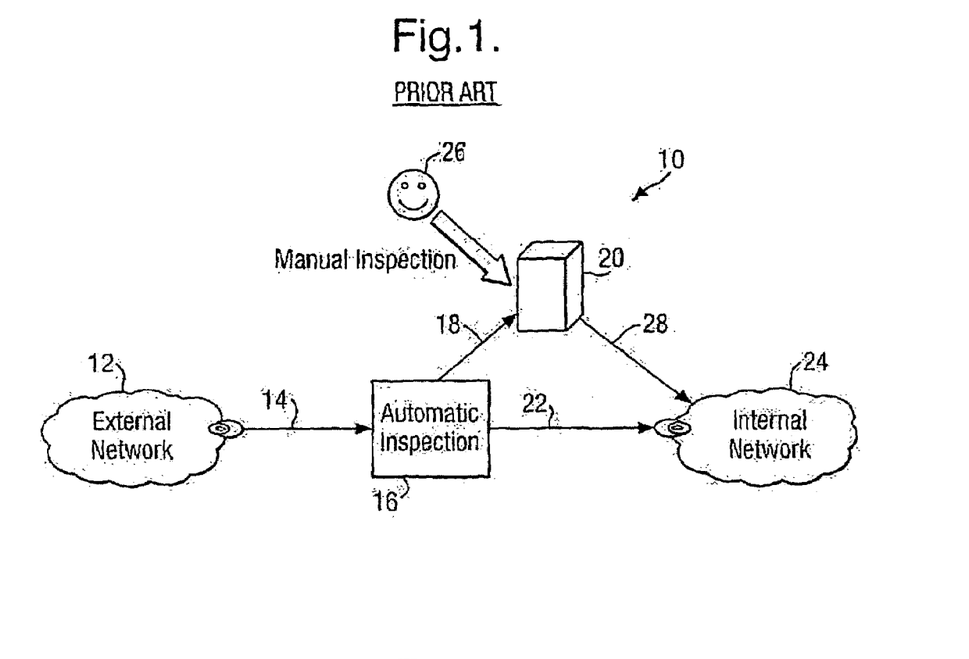
FIGS. 1 and 2 are schematic diagrams of prior art computer systems.

Referring to FIG. 1, a prior art computer system protection 10 is illustrated which corresponds to current industry best practice, an external computer network 12 supplies incoming data 14 to automatic inspection software 16 (software checker) as the data enters a computer system (not shown). The software checker 16 routes any suspect data 18 to a quarantine memory 20, which is implemented as a portion of a server computer's file storage protected by the operating system's access controls; it transmits harmless data 22 to an internal receiving network 24. The quarantine area is in a central network operations centre and is accessible only by expert inspection staff 26 responsible for manual inspection of suspect data. These experts monitor the quarantine storage 20 for harmless data, and when it is found it is transmitted as cleared data 28 to the receiving network 24. The software checker 16 will both treat as suspect a proportion of data that is in fact harmless, and fail to identify new kinds of attack. Expert inspection staff 26 are costly, introduce delay and are not infallible.

Figure 2:
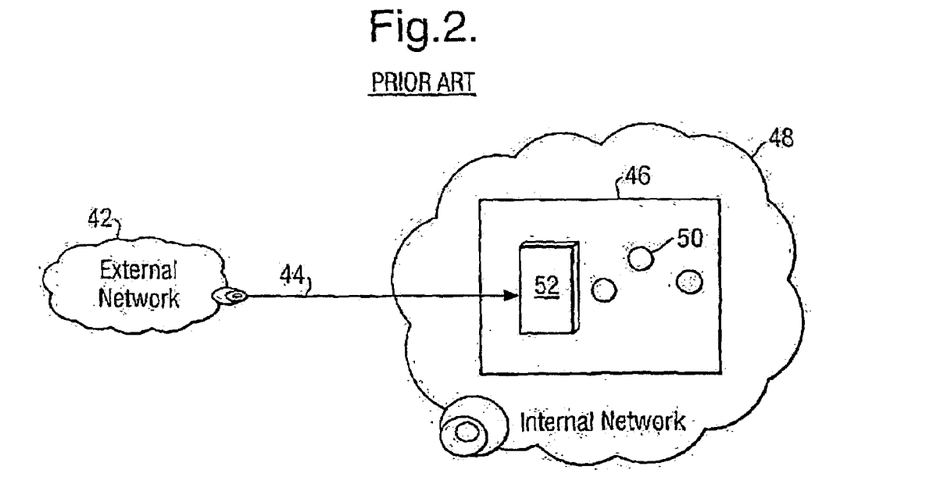
Figure 3:
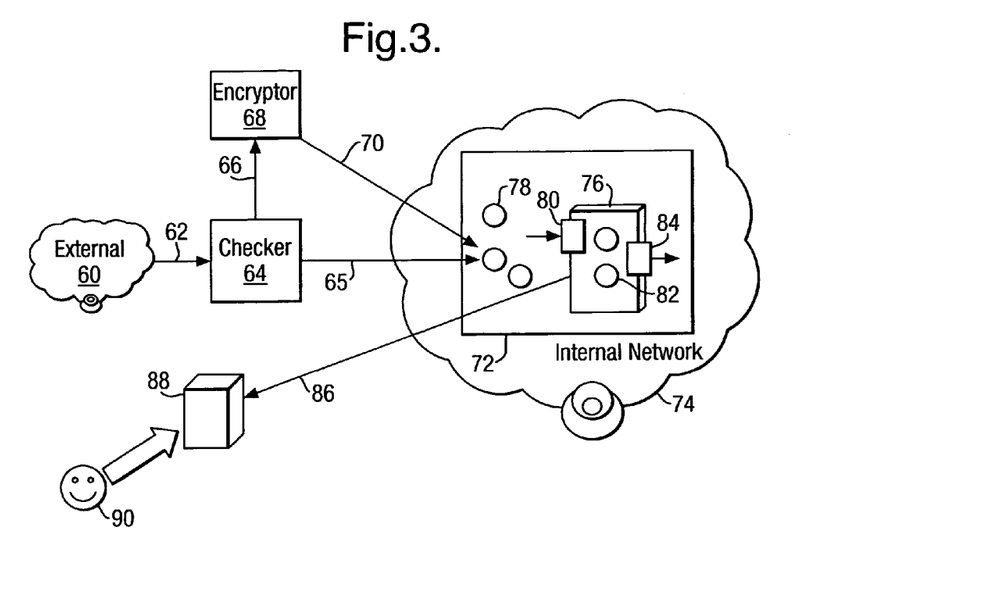
FIG. 3 is a schematic diagram of computer protection of the invention.

Referring to FIG. 2, the prior art technique known as sandboxing is illustrated. An external computer network 42 supplies incoming data 44 to a user's computer 46 which is part of an internal computer network 48. The data 44 is not accessible by main desktop software application (e.g. word processing) running on the computer 46 and indicated by circles such as 50: instead the data 44 is passed to a sandbox 52 providing a constrained environment, and the data cannot corrupt software applications outside it, i.e. beyond the sandbox boundary. The sandbox may be implemented by interpreting the application software running within it, as is the case with JAVA, and ensuring that not instruction exists that gives access to data beyond the sandbox's boundary. Alternatively, the application software may be directly executed, but operating system access controls are applied to all resources beyond the sandbox boundary to prevent the sandboxed software from accessing it. Computer system protection in accordance with the invention is illustrated in FIG. 3. An external computer network 60 (e.g. the Internet) supplies incoming data 62 to checker software 64 as the data enters a computer system (not shown). The software checker 64 passes on any data 65 it deems harmless; it routes any suspect data 66 to an encryptor 68 which encrypts it to render it unusable and therefore harmless. Any symmetric encryption algorithm rendering data unusable would be suitable, such as the standard Data Encryption Standard (DES), described by the US Federal Information Processing Standards Publication 46-2.

Harmless data 65 and encrypted suspect data 70 are passed to a user's computer 72 which is part of an internal computer network 74. The computer 72 has within it a desktop quarantine area or sandbox 76 for suspect data, and this applies to each computer 72 connected into the network 74. The computer 72 runs main desktop applications such as 78 which receive the encrypted data 70 and can store it and pass it around, but these applications 78 cannot use it in any meaningful way because it is encrypted. Equally well the applications 78 cannot be interfered with by the encrypted data because encryption makes it impossible to execute or interpret the data.

On entry into the sandbox 76, the encrypted data is decrypted to usable form by a sandbox import function 80: it then becomes accessible by software applications or tools 82 executing in the sandbox 76. Release check software 84 is included in the sandbox 76 for checking whether or not an extract from decrypted data is harmless. Data which does not pass through the release check 84 because it is suspect may be important enough to require manual inspection by experts. In such cases, a user submits a request 86 that the suspect data be inspected, perhaps by e-mail or via a web interface to a request queue 88. Experts 90 take requests from the queue 88 and respond by decrypting the suspect data and manually checking it.

The advantage of this approach is that a user can examine the suspect data and even execute it if necessary while it is constrained by the sandbox, allowing the user to decide the importance of suspect data quarantined by encryption. If the user decides the suspect data is irrelevant to the user's business needs, for example unsolicited advertising material, the user can discard it, saving wasted effort on the part of a manual inspection team. Conversely, if the suspect data is part of an important message relevant to the user's work, the whole message is not delayed awaiting scrutiny by a manual inspection team, but instead is made available to the user in the constrained environment of their desktop sandbox.

The desktop quarantine area 76 implemented by the invention is a type of a sandbox because within it a user may work with suspect data in decrypted form using constrained sandbox applications 82. The sandbox can be constructed using appropriate tools well known in the prior art, for example JAVA or operating system controls. The cryptographic mechanism ensures that suspect data cannot be accessed outside the sandbox 76 in non-encrypted form by a user's main desktop applications. Suspect data attempting to cause damage is inhibited by the sandbox 76.

To carry out a business function, a computer user may well need to make extracts from suspect data, for example by using cut-and-paste facilities provided by the applications, and move it from the sandbox 76 to make it accessible by main desktop applications 78: it is then necessary to check that each extract is harmless. In may cases it will be possible for automatic release check software such as 84 to assert confidently that an extract is harmless, even though it is not possible to do so for the suspect data as a whole. For example, data in the form of a document containing macros might be considered suspect, but the document might contain extracts such as paragraphs of text which might be decreed harmless by checker software.

In many cases the sandbox 76 avoids the need for a manual inspection: however, data that is suspect will sometimes need to be taken from the sandbox 76 and transferred to a user's main desktop environment for access by applications 78. This will be rejected by the release check 84 because it is suspect and so will still required manual inspection by experts 90, to whom requests 86 for manual inspection are submitted.

Since a user is now requesting the manual inspection, it is possible to assign priorities and costs according to business needs. Moreover, inspections are performed far less frequently and only when strictly necessary because the invention avoids unnecessary checking of material which is for example unimportant or for which a "clean" or edited version of it can be obtained from the sender at the user's request.

The invention employs standard techniques for detecting Trojan Horse and virus software to inspect incoming data for suspect contents. Should any part of the incoming data, for example an attachment of an e-mail message, be considered a potential attack, it is encrypted. The original data is modified by replacing suspect parts of it with an encrypted equivalent and the data so modified is allowed to proceed as normal. Thus an e-mail message with one suspect attachment would be allowed to proceed with that attachment replaced by an encrypted version, but the message body and any other attachments would remain readable.

Encryption renders data unusable, hence encrypted suspect data can be safely allowed to pass to a user's computer 72: it remains unusable until it is decrypted by an appropriate decryption key, which is not available to users or their main desktop applications but is as has been said available to the sandbox import function 80.

Having received an encrypted form of some suspect data, a user views or manipulates it by passing it to the sandbox 76 whereupon it is decrypted to usable form as indicated at 80.

When decrypted the suspect data can be accessed by software applications 82 running in the sandbox 76. The main desktop and the sandbox may be running the same applications, but they create separate instances of these applications which cannot communicate with one another. For example, Microsoft® Word could be used to edit documents both on the main desktop and in the sandbox: if so, Word would be run in two separate instances, i.e. one for the main desktop and the other for the sandbox, and the two instances would not be able to communicate directly with one another.

Figure 4:
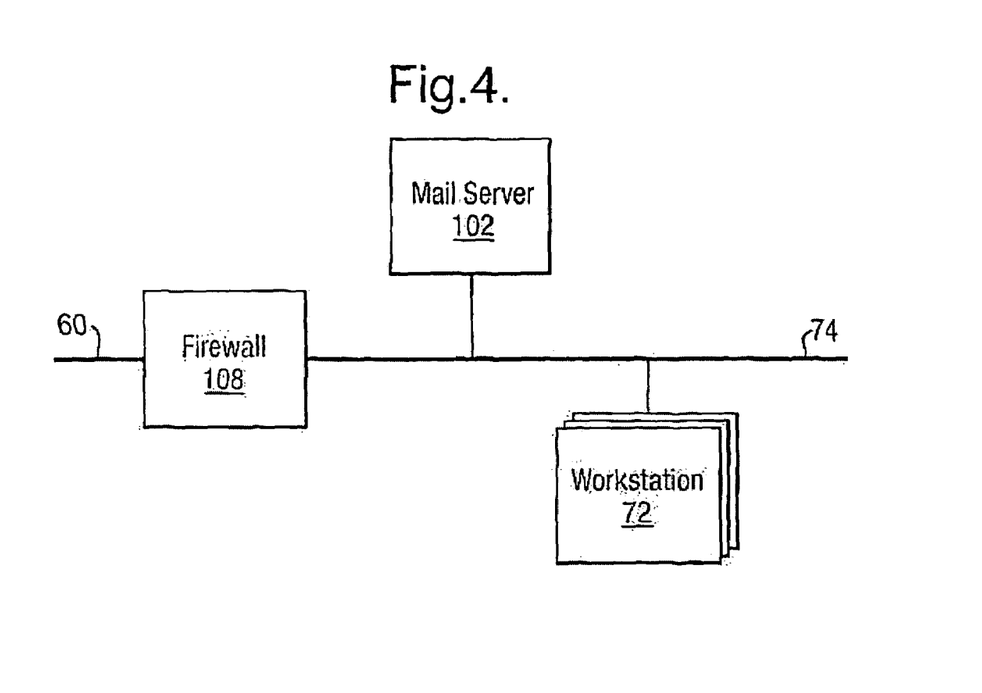
FIGS. 4 and 5 illustrate use of firewalls for computer-protection.

FIG. 4 (in which parts equivalent to those described earlier are like-referenced) shows the internal or corporate network 74 hosting a mail server 102 and a number of user computers (workstations) such as 72. The network 74 is defended from hostile data on the Internet 60 by a computer 108 referred to as a firewall which controls communication between applications running on computers in different networks. The textbook "Building Internet Firewalls" by D B Chapman and E D Zwicky discloses interposing a software application proxy in a computer such as 108 between networks. The computer 108 is referred to as a proxy firewall or bastion host firewall. Software applications on the linked networks 60 and 74 communicate via an application proxy on the computer 108.

Figure 5:
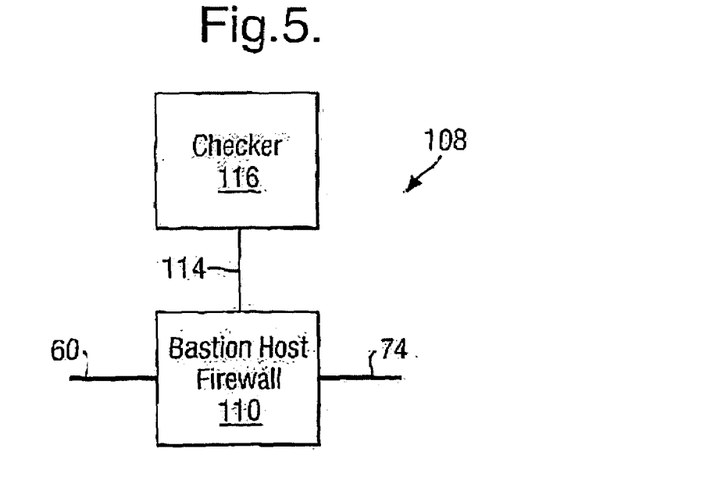

The computer firewall 108 is shown in more detail in FIG. 5: it comprises a bastion host 110 that mediates network accesses between the Internet 60 and the corporate network 74, together with a checker 116 connected to the bastion host 110 via a secondary network 114 reserved exclusively for this purpose commonly called a de-militarised zone.

The bastion host 110 is commercially available firewall software, such as Network Associates' Gauntlet. The checker 116 is a computer hosting an e-mail proxy, that incorporates server side components of desktop quarantine; i.e. the checker 64 and the encryptor 68.

Figure 6:
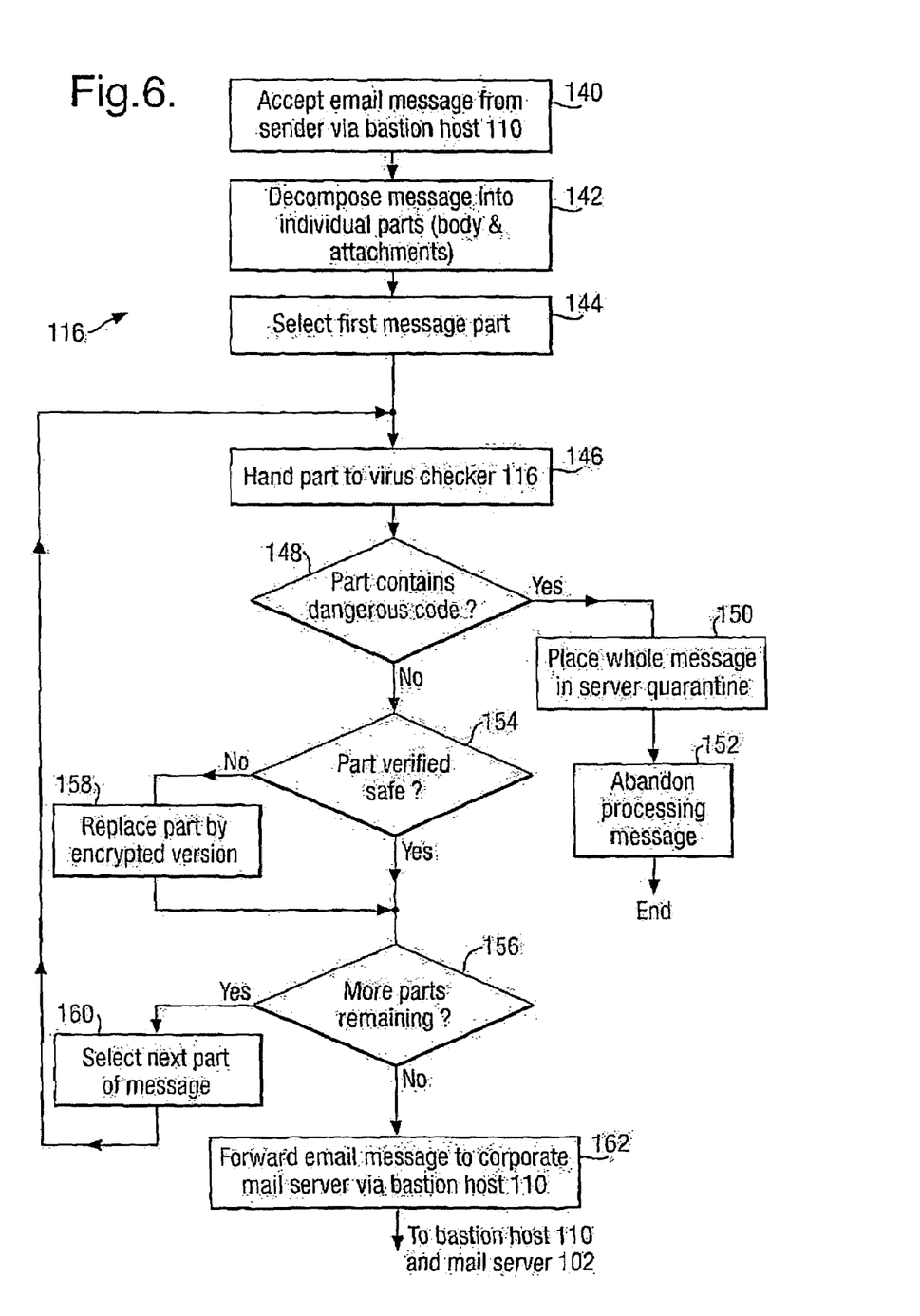
FIG. 6 is a flow diagram of a computer protection procedure in accordance with the invention.

The flow diagram illustrated in FIG. 6 shows the action of the checker 116 in the present embodiment of the invention, although checks on e-main can be implemented using standard virus checker software such as Sophos Sweep which is commercially available. At 140 an e-mail message is accepted from an external sender via the bastion host 110 (not shown). The message is decomposed at 142 into individual parts (message body & attachments), and a first such part is selected at 144 for checking at 146 by the virus checker 116.

If the part is found at 148 to contain dangerous code, then the whole message is placed in server quarantine 150 and processing of the message is abandoned at 152. If alternatively the part is not identified at 148 as containing dangerous code, and also if it is verified safe at 154 then it is passed to the next stage 156 where it is stored temporarily.

If the message part cannot be verified safe (harmless) at 154 then it is encrypted at 158: the resulting encrypted version replaces the unverified message part and passes to the next stage 156 for temporary storage. If one or more parts remain in the message, then the next part is selected at 160 and the procedure beginning with step 146 is iterated for that part. This continues for successive message parts until no more parts remain or until abandonment of message processing has taken place at 152, whichever occurs first. If there has been no such abandonment by the time the last message part has been processed, a partially encrypted and partially non-encrypted e-mail message will have accumulated in storage at 156. This stored message is forwarded at 162 to the corporate mail server 102 via the bastion host firewall 110.

Figure 7:
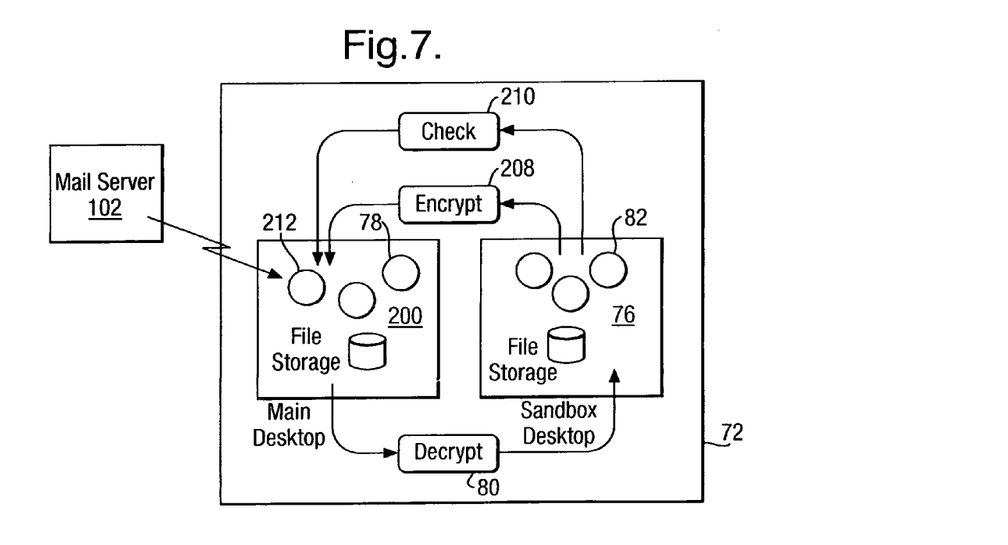
FIG. 7 illustrates use of main and sandbox desktops on a workstation in accordance with the invention.

The workstations 72 are organised as shown in FIG. 7, in which parts equivalent to those described earlier are like-referenced. Each workstation 72 has the feature that processing and storage are divided and associated with respective user desktops—a main desktop 200 in which a user works on trusted data with applications 78, and a sandbox desktop 76 with software applications such as 82 for working with data in desktop quarantine. The main and sandbox desktop applications 78 and 82 are isolated from one another: i.e. the main desktop applications 78 do not have access to data being processed by the sandbox desktop applications 82 and therefore cannot be harmed by such data.

Software for three special system processes run on the workstation 72, a decryption process 80, an encryption process 208 and a check process 210: these provide a user with the ability to move data between the two desktops 76 and 200. The decryption process 80 takes encrypted data from the main desktop 200, decrypts it and moves it to the sandbox desktop 76. The encryption process 208 performs a converse action of taking decrypted data from the sandbox 76, encrypting it and moving it to the main desktop 200. The check process 210 moves data from the sandbox 76 to the main desktop 200 without encrypting it, subject to the criterion that data so moved has passed content checks establishing that it does not contain any potentially damaging code.

Referring to FIGS. 4 and 5 once more, the firewall 108 may receive a mess with an attachment which appears to be an executable but which is not clearly an attack: the bastion host 110 then passes the message to the checker 116. If the checker 116 ascertains that the attachment is suspect, the checker 116 encrypts it with an encryption key. The resulting message with encrypted attachment is passed back through the bastion host 110 and on to the corporate mail server 102.

The message's recipient workstation 72 runs a mail client software application 212 on the main desktop 200 and retrieves the message from the mail server 102. The mail client 212, or any other software 78 running on the main desktop 200, is able to access the encrypted attachment: this software cannot however decrypt the encrypted attachment because it does not have access to the relevant encryption key. Thus suspect data contained in the encrypted attachment cannot be accessed or executed.

Should a user decide that the encrypted attachment is uninteresting, perhaps by reading the message to which it is attached, it can be deleted. However, a user wishing to access data in the encrypted attachment must first use the decrypt process 80 to decrypt the attachment and pass its data to the sandbox desktop 76. Once in the sandbox desktop 76, the data can be accessed or executed by software applications 82, but the sandbox restrictions constrain the application's behaviour so if the data in the attachment proves to be an attack any consequential damage is contained within the sandbox, affecting only applications 82 and their data, not applications 78.

If the user needs to take some of the data contained in the attachment back to the main desktop 200, it is passed through the check process 210. This applies content checkers to the data and only allows it to pass if it can be determined safe. Data failing the check process 210 does not pass from the sandbox desktop 76 to the main desktop 200.

If the data contained in the attachment is needed but fails the check process 210, the user may pass it back to the main desktop 200 through the encryption process 208: this encrypts the data which becomes unusable and hence safe. The encrypted data may be passed (e.g. by e-mail) to a central team of security experts for a manual review.

In the above example a message or attachment is placed in server quarantine 150 if it is proves to contain dangerous code. However, alternative strategies are also possible: for example, a message could be sent on its way after a suspect part has been replaced by a notification of the part's removal. Alternatively, parts found to be potentially dangerous could be marked as such, encrypted and then sent on their way accompanied by remaining unencrypted parts. The decryption process 80 on a user's workstation 72 would not decrypt potentially dangerous data, but the equivalent on the desktop of the central team of security experts would do so.

The invention improves the handling of data found to be suspect by checker software such as 116. This reduces the effort required for expert manual intervention to check suspect data because in many cases a user will take all necessary action without involving experts: i.e. a user will delete unwanted data in some cases and in others request repeat messages from a sender. This user action avoids the need for expert inspection and so eliminates delays introduced by it.

Appropriate computer software or computer programs to implement the invention are either commercially available (e.g. sand box, firewall or checker software) or can be implemented (e.g. where interfacing is required) straightforwardly by a programmer of ordinary skill without requiring invention. It can easily be recorded on a carrier medium and run on a computer system of the kind described above. Such software and system will therefore not be described further.

The invention claimed is:

1. A computer system for receiving potentially harmful incoming data from an external source, the computer system including:
    a) a sandbox application for receiving data and defining a sandbox desktop,
    b) program code for execution of a data checking method comprising:
        i) receiving incoming data and checking it to determine whether it is harmless data or suspect data,
        ii) passing on data determined to be harmless for processing with an application associated with a main desktop of the computer system, and
        iii) sending for encryption data determined to be suspect data,
    c) encrypting means for encrypting the suspect data to transform it to encrypted data and thereby render it harmless,
    d) decrypting means for decrypting the encrypted data to transform it to decrypted data, and e) a constrained application constrained by the sandbox application for processing the decrypted data.

2. A computer system for receiving potentially harmful incoming data from an external source, the computer system including
  a) a sandbox application for receiving data and defining a sandbox desktop,
  b) checking means for:
    i) receiving incoming data and in such data distinguishing harmless data from suspect data,
    ii) passing on the harmless data for processing with an application associated with a main desktop of the computer system, and
    iii) sending the suspect data for encryption,
  c) encrypting means for receiving the suspect data from the checking means and encrypting the suspect data to transform it to encrypted data and thereby render it harmless,
  d) decrypting means arranged to decrypt the encrypted data to transform it to decrypted data, and
  e) a constrained application constrained by the sandbox application arranged to process the decrypted data.

3. A computer system according to claim 2 wherein the constrained application does not communicate directly with any application associated with a main desktop of the computer system.

4. A computer system according to claim 2 or 3 associated with means for enabling a user to retrieve data from the sandbox application in encrypted form for relaying to expert inspection.

5. A computer system according to claim 2 or 3 including means for checking decrypted data released from the sandbox application for potentially harmful content.

6. A computer system according to claim 2 or 3 linked via a firewall to the external source which is a network.

7. A computer system according to claim 2 or 3 including a firewall protecting the checking means from the external source to which the firewall is linked.

8. A computer system according to claim 2 including software for encrypting potentially harmful data which a user may wish to process using an application associated with a main desktop of the system instead of the sandbox application.

9. A computer system according to claim 2 including software for enabling a user to retrieve data from the sandbox application in encrypted form for relaying to expert inspection.

10. A computer system according to claim 2 including software for checking decrypted data released from the sandbox application for potentially harmful content and suitability for processing by a main desktop application of the computer system.

11. A method for protecting a computer system against potentially harmful incoming data from an external source, the computer system including a sandbox application for receiving data and defining a sandbox desktop, and means for decrypting data, and the method incorporating the steps of:
  a) distinguishing harmless data from suspect data in the incoming data,
  b) passing on the harmless data for processing with an application associated with a main desktop of the computer system,
  c) encrypting the suspect data to transform it into harmless encrypted data,
  d) decrypting the encrypted data to transform it into decrypted data, and
  e) processing the decrypted data by means of a constrained application constrained by the sandbox application.

12. A method of protecting a computer system against potentially harmful incoming data from an external source, the computer system including a sandbox application for receiving data and defining a sandbox desktop, and decrypting means for decrypting data, and the method incorporating the steps of:
  a) checking incoming data to distinguish therein harmless data from suspect data,
  b) passing on data deemed to be harmless data for processing with an application associated with a main desktop of the computer system,
  c) encrypting data deemed to be suspect data to transform it to encrypted data and thereby render it harmless,
  d) decrypting the encrypted data to transform it to decrypted data for receipt by the sandbox application, and
  e) processing the decrypted data with a constrained application constrained by the sandbox application.

13. A method of protecting a computer system according to claim 12 wherein the steps of checking incoming data, passing it on if deemed harmless, sending suspect data for encryption and encrypting it are carried out by checking means protected by a firewall from the external source.

14. A method of protecting a computer system according to claim 12 or 13 wherein the constrained application does not communicate with any application associated with the main desktop.

15. A method of protecting a computer system according to claim 12 or 13 including the step of retrieving data from the sandbox application in encrypted form for relaying to expert inspection.

16. A method of protecting a computer system according to claim 12 or 13 including checking decrypted data released from the sandbox desktop for potentially harmful content.

17. A method of protecting a computer system according to claim 12 wherein the computer system is linked via a firewall to the external source which is a network.

18. A computer readable medium having program code recorded thereon for protecting a computer system against potentially harmful incoming data received from an external source, the program code including decrypting code for decrypting data and a sandbox application for receiving data and defining a sandbox desktop, and the program code being for execution of a method comprising:
  a) distinguishing harmless data from suspect data in the incoming data,
  b) passing on the harmless data for processing with an application associated with a main desktop of the computer system,
  c) encrypting the suspect data to transform it to encrypted data and thereby render it harmless,
  d) decrypting the encrypted data to transform it to decrypted data, and
  e) processing the decrypted data using a constrained application constrained by the sandbox application.

19. A computer readable medium having program code recorded thereon for protecting a computer system against potentially harmful incoming data received from an external source, the program code including decrypting code for decrypting data and a sandbox application for receiving data and defining a sandbox desktop, and the program code being for execution of a method comprising:
  a) checking incoming data and deeming it harmless data or suspect data,
  b) passing on data deemed harmless data for processing with an application associated with a main desktop of the computer system, c) encrypting data deemed suspect data to transform it to encrypted data and thereby render it harmless, d) decrypting the encrypted data to transform it to decrypted data for receipt by the sandbox application, and e) processing the decrypted data with a constrained application constrained by the sandbox application.

20. A computer readable medium according to claim 19 wherein the constrained application is arranged not to communicate directly with any application associated with a main desktop of the computer system.

21. A computer readable medium according to claim 19 or 20 arranged to control the computer system to retrieve data from the sandbox application in encrypted form for relaying to expert inspection.

22. A computer readable medium according to claim 19 or 20 arranged to control the computer system to check decrypted data released from the sandbox desktop for potentially harmful content.

* * * * *